United States Patent
Harres

(10) Patent No.: US 8,045,143 B2
(45) Date of Patent: Oct. 25, 2011

(54) OPTICAL PHASE DOMAIN REFLECTOMETER

(75) Inventor: Daniel N. Harres, Belleville, IL (US)

(73) Assignee: The Boeing Company, Chicago, IL (US)

(*) Notice: Subject to any disclaimer, the term of this patent is extended or adjusted under 35 U.S.C. 154(b) by 1109 days.

(21) Appl. No.: 11/551,951

(22) Filed: Oct. 23, 2006

(65) Prior Publication Data
US 2008/0094615 A1   Apr. 24, 2008

(51) Int. Cl.
*G01N 21/00* (2006.01)

(52) U.S. Cl. ......................................... 356/73.1

(58) Field of Classification Search .................. None
See application file for complete search history.

(56) References Cited

U.S. PATENT DOCUMENTS

| | | | |
|---|---|---|---|
| 4,833,668 A | | 5/1989 | Rowley et al. |
| 4,997,277 A | * | 3/1991 | Horiguchi et al. ............ 356/73.1 |
| 5,072,111 A | * | 12/1991 | Gilino ...................... 250/227.15 |
| 5,093,568 A | | 3/1992 | Maycock |
| 5,343,286 A | * | 8/1994 | Keeble et al. ................ 356/73.1 |
| 5,353,110 A | | 10/1994 | Jones |
| 5,450,191 A | | 9/1995 | Parks et al. |
| 5,453,865 A | * | 9/1995 | Faulkner et al. ................... 398/9 |
| 5,467,942 A | | 11/1995 | Abbas et al. |
| 5,479,251 A | | 12/1995 | Hanson |
| 5,530,546 A | | 6/1996 | Barringer et al. |
| 5,592,284 A | | 1/1997 | Bedard |
| 5,809,187 A | | 9/1998 | Peck, Jr. et al. |
| 5,844,235 A | * | 12/1998 | Tachikawa et al. ...... 250/227.14 |
| 5,995,255 A | | 11/1999 | Giles |
| 6,008,487 A | * | 12/1999 | Tachikawa et al. ...... 250/227.14 |
| 6,046,797 A | | 4/2000 | Spencer et al. |
| 6,317,535 B1 | | 11/2001 | Jennings et al. |
| 6,376,830 B1 | | 4/2002 | Froggatt et al. |

(Continued)

FOREIGN PATENT DOCUMENTS

WO   2004003502   1/2004

(Continued)

OTHER PUBLICATIONS

The Boeing Company, International Search Report corresponding to International Patent Application No. PCT/US2007/080921 dated Feb. 29, 2008.

(Continued)

*Primary Examiner* — Tarifur Chowdhury
*Assistant Examiner* — Gordon Stock, Jr.
(74) *Attorney, Agent, or Firm* — Moore & Van Allen PLLC; Charles L. Moore

(57) ABSTRACT

An apparatus to measure optical characteristics of an optical medium may include an optical source to generate an optical square wave for transmission into the optical medium and an optical receiver to receive a reflected optical waveform from the optical medium caused by a portion of the optical square wave being reflected by any anomaly in the optical medium. The optical receiver may convert the reflected optical waveform to a reflected electrical waveform. The apparatus may also include a module to combine the reflected electrical waveform with a reference waveform to form a resulting waveform. The reference waveform may correspond substantially to the optical square wave and may be delayed a predetermined time duration. A controller may be included to process the resulting waveform to detect any anomaly and a location of the anomaly in the optical medium based on an amplitude of the resulting waveform at a sample delay position in the resulting waveform.

12 Claims, 7 Drawing Sheets

U.S. PATENT DOCUMENTS

| | | |
|---|---|---|
| 6,381,010 B1 | 4/2002 | Piffaretti |
| 6,381,011 B1 | 4/2002 | Nickelsberg et al. |
| 6,381,270 B1 | 4/2002 | Lydon et al. |
| 6,456,370 B1 | 9/2002 | Ingles, Jr. |
| 6,519,026 B1 | 2/2003 | Holland |
| 6,577,385 B1 | 6/2003 | Sakamoto et al. |
| 6,614,512 B1 | 9/2003 | Sakamoto et al. |
| 6,674,518 B1 | 1/2004 | Asher et al. |
| 6,700,655 B2 | 3/2004 | Uchiyama et al. |
| 6,724,469 B2 | 4/2004 | Leblanc |
| 6,771,361 B2 | 8/2004 | Araki et al. |
| 7,011,453 B1 | 3/2006 | Harres |
| 7,027,685 B2 | 4/2006 | Harres |
| 7,030,975 B2 | 4/2006 | Harres |
| 7,050,665 B2 | 5/2006 | Harres et al. |
| 7,095,493 B2 | 8/2006 | Harres |
| 7,304,725 B2 * | 12/2007 | Hartog et al. ............... 356/73.1 |
| 2002/0025124 A1 | 2/2002 | Green et al. |
| 2002/0154291 A1 | 10/2002 | Uchiyama et al. |
| 2004/0062553 A1 | 4/2004 | Harres |
| 2004/0071438 A1 | 4/2004 | Harres et al. |
| 2005/0110979 A1 * | 5/2005 | Harres ........................ 356/73.1 |
| 2005/0254038 A1 | 11/2005 | Harres |
| 2006/0028636 A1 | 2/2006 | Payton |
| 2006/0232765 A1 * | 10/2006 | Harres ........................ 356/73.1 |
| 2007/0146721 A1 * | 6/2007 | Barcelos et al. ............. 356/477 |

FOREIGN PATENT DOCUMENTS

WO      2005068965      7/2005

OTHER PUBLICATIONS

The Boeing Company, Written Opinion corresponding to International Patent Application No. PCT/US2007/080921 dated Feb. 29, 2008.

Jensen et al., A Broadband 10-GHz Track-and-Hold in Si/SeGe HBT Technology, IEEE J. of Solid-State Circuits, vol. 36, No. 3, Mar. 2001.

* cited by examiner

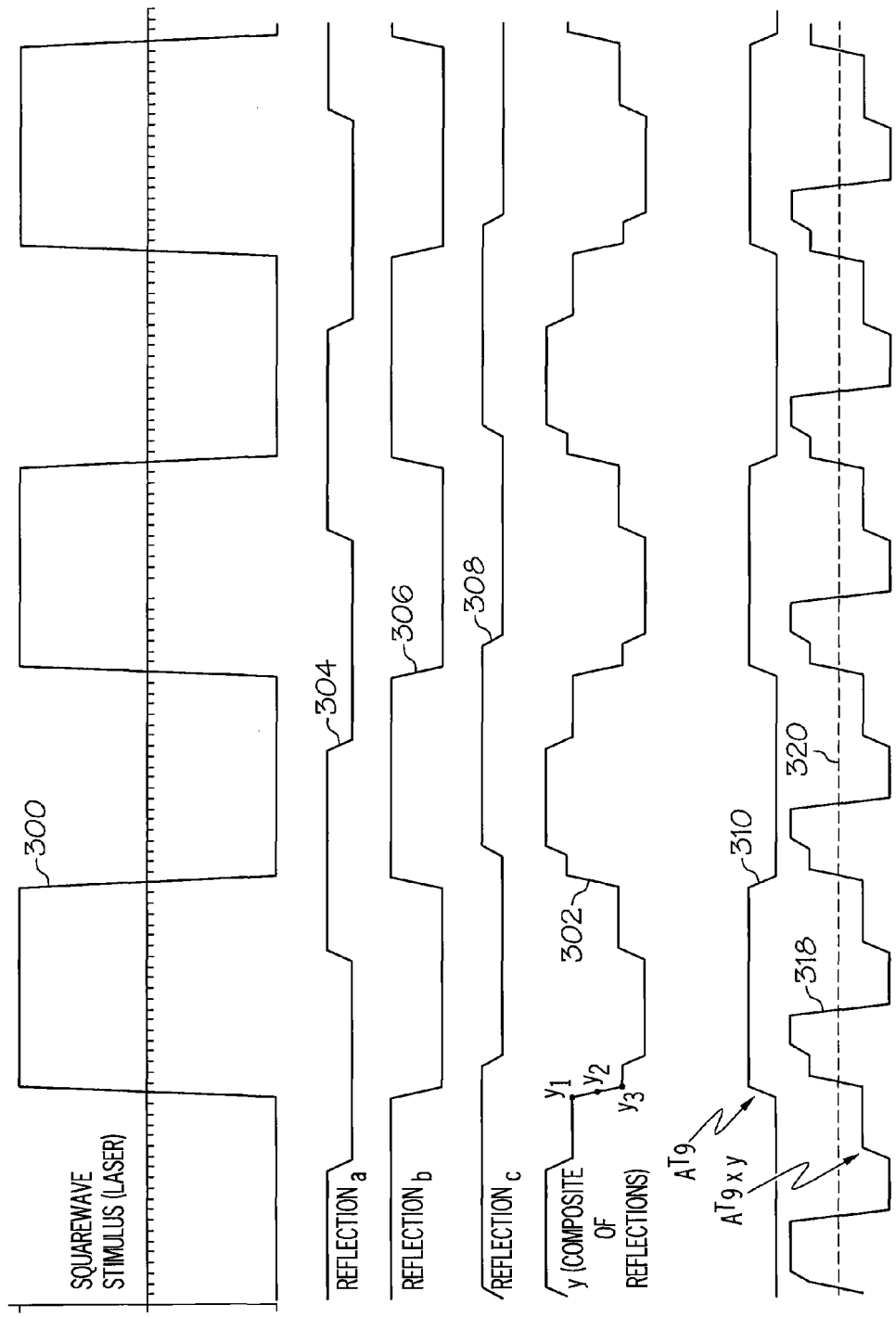

OPTICAL PHASE DOMAIN REFLECTOMETER

BACKGROUND OF THE INVENTION

The present invention relates to optical signal transmission systems or the like and more particularly to an optical phase domain reflectometer and method for detecting any reflections, anomalies or defects in a fiber optic transmission line or other optical medium.

Transmission lines are commonly employed to communicate signals between various portions of an electronic system. For example, coaxial transmission lines, waveguides, and even parallel arrangements of metallic conductors are typically employed as transmission lines in such systems. Increasingly, fiber-optic transmission lines or other optical media are being used instead of conventional metallic transmission lines to communicate signals in electronic systems due to the generally higher noise immunity and lower signal attenuation properties obtainable in such lines. Additionally, fiber-optic transmission lines are generally thinner and lighter than metallic conductors of comparable capacity.

In systems employing fiber optic transmission lines or the like, difficulties may arise due to degradation of the line resulting from physical damage, aging, poorly matched and/or damaged connectors, or for other reasons. In practice, difficulties with transmission lines are frequently difficult to detect and diagnose, particularly in electronic systems where only a single terminal end of the transmission line may be accessible. Although a number of different methods are available to detect and diagnose transmission line difficulties, one useful and commonly employed method is time domain reflectometry. In time domain reflectometry, an optical pulse or pulses may be transmitted into a fiber optic transmission line or medium. Any anomalies or defects may result in a reflected signal which may be detected by a time domain reflectometer. Such reflectometers are usually formed from standard components as opposed to custom parts to keep costs reasonable. These standard components, such as mixers or the like, may require appropriate input or drive signals and modulation signals for optimum operation and ability to effectively measure and analyze input pulses and reflected waveforms and mixed or modulated waveforms to detect any reflections at selected segments along a fiber optic transmission line or other optical medium.

BRIEF SUMMARY OF THE INVENTION

In accordance with an embodiment of the present invention, an apparatus to measure optical characteristics of an optical medium may include an optical source to generate an optical square wave for transmission into the optical medium and an optical receiver to receive a reflected optical waveform from the optical medium caused by a portion of the optical square wave being reflected by any anomaly in the optical medium. The optical receiver may convert the reflected optical waveform to a reflected electrical waveform. The apparatus may also include a module to combine the reflected electrical waveform with a reference waveform to form a resulting waveform. The reference waveform may correspond substantially to the optical square wave and may be delayed a predetermined time duration. A controller may be included to process the resulting waveform to detect any anomaly and a location of the anomaly in the optical medium based on an amplitude of the resulting waveform at a sample delay position in the resulting waveform.

In accordance with another embodiment of the present invention, an optical system may include a fiber optic transmission line or optical medium. The optical system may also include an optical phase domain reflectometer. The optical phase domain reflectometer may include a module to combine a reflected waveform from the fiber optic transmission line or optical medium and a reference waveform to form a resulting waveform. The reference waveform may correspond substantially to an optical waveform transmitted into the fiber optic transmission line or optical medium. The reference waveform may be delayed a predetermined time duration. The reflectometer may also include a controller to process the resulting waveform to detect any anomaly and a location of the anomaly in the optical medium based on an amplitude of the resulting waveform at a sample delay position in the resulting waveform.

In accordance with another embodiment of the present invention, an aerospace vehicle may include a fuselage and other components. The aerospace vehicle may also include a fiber optic transmission line or optical medium disposed in the fuselage, other components or both. The aerospace vehicle may also include an optical phase domain reflectometer. The optical phase domain reflectometer may include a module to combine a reflected waveform from the fiber optic transmission line or optical medium and a reference waveform to form a resulting waveform. The reference waveform may correspond substantially to an optical waveform transmitted into the fiber optic transmission line or optical medium and the reference waveform may be delayed a predetermined time duration. The reflectometer may also include a controller to process the resulting waveform to detect any anomaly and a location of the anomaly in the optical medium based on an amplitude of the resulting waveform at a sample delay position in the resulting waveform.

In accordance with another embodiment of the present invention, a method to measure optical characteristics of a fiber optic transmission line or other optical medium may include transmitting an optical wave into the fiber optic transmission line or other optical medium. The method may also include receiving a reflected optical waveform from the optical medium caused by a portion of the optical square wave being reflected by any anomaly in the optical medium. The method may also include converting the reflected optical waveform to a reflected electrical waveform and combining the reflected electrical waveform with a reference waveform to form a resulting waveform. The reference waveform may correspond substantially to the optical square wave and may be delayed a predetermined time duration. The method may further include processing the resulting waveform to detect any anomaly and a location of the anomaly in the optical medium based on an amplitude of the resulting waveform at a sample delay position in the resulting waveform.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 3A-3C are illustrations of exemplary waveforms to measure optical characteristics of a fiber optic transmission line or other optical medium in accordance with an embodiment of the present invention.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
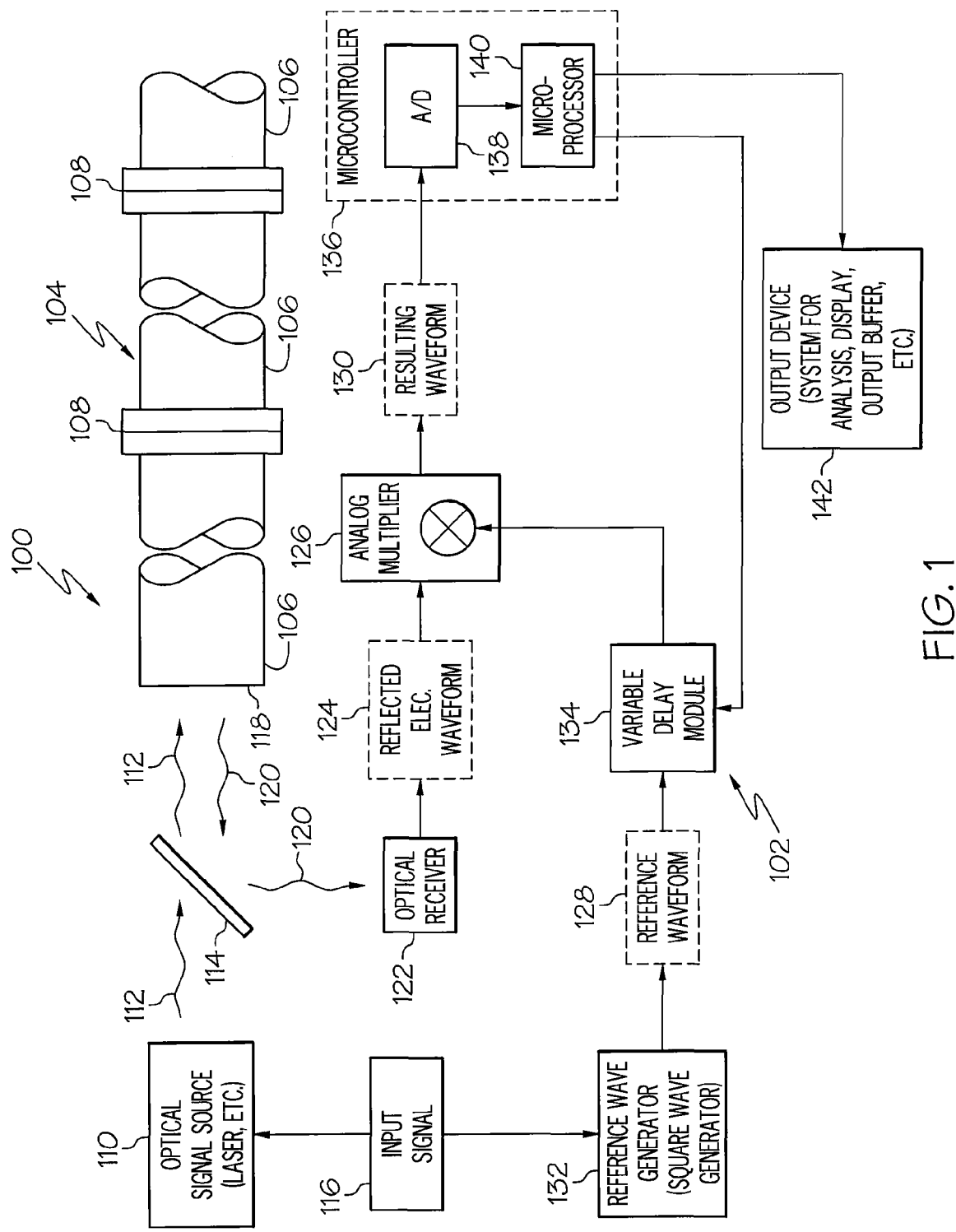
FIG. 1 is a block diagram of an exemplary optical system including an optical phase domain reflectometer in accordance with an embodiment of the present invention.

FIG. 1 is a block diagram of an exemplary optical system 100 including an optical phase domain reflectometer 102 in accordance with an embodiment of the present invention. The optical system 100 may include a fiber optic transmission line 104 or other optical medium to transmit optical energy in the form of optical signals. The fiber optic transmission line 104 may be formed by multiple line portions 106 that may each be joined together by suitable optical connectors 108 to minimize signal reflections. The reflectometer 102 may measure optical characteristics of the line 104. Measuring optical characteristics may include, but is not necessarily limited to detecting reflections that may be caused by anomalies in the line 104 or optical medium, such as discontinuities, defects, degradation or the like.

Figure 3A:
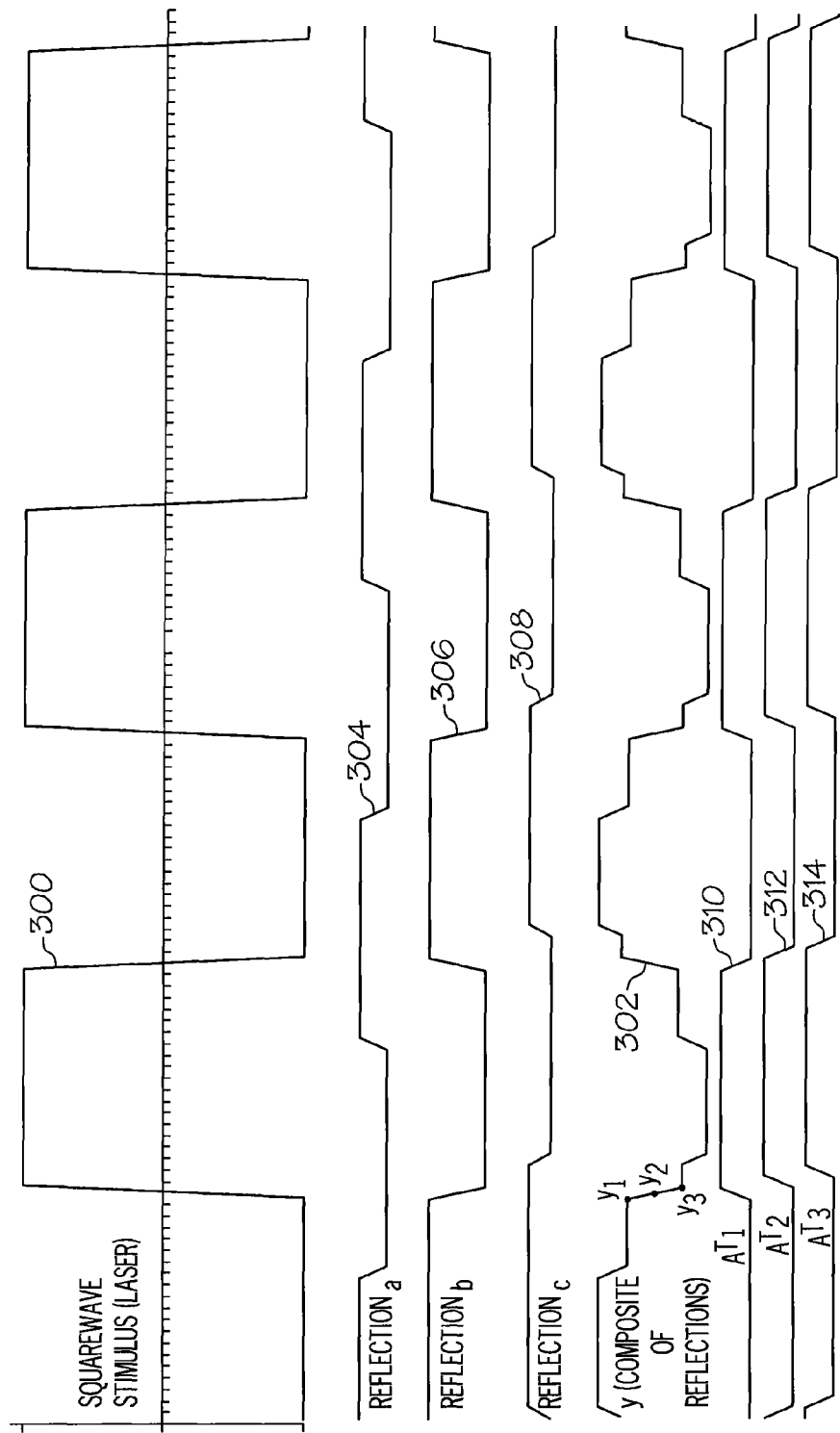
Figure 3B:
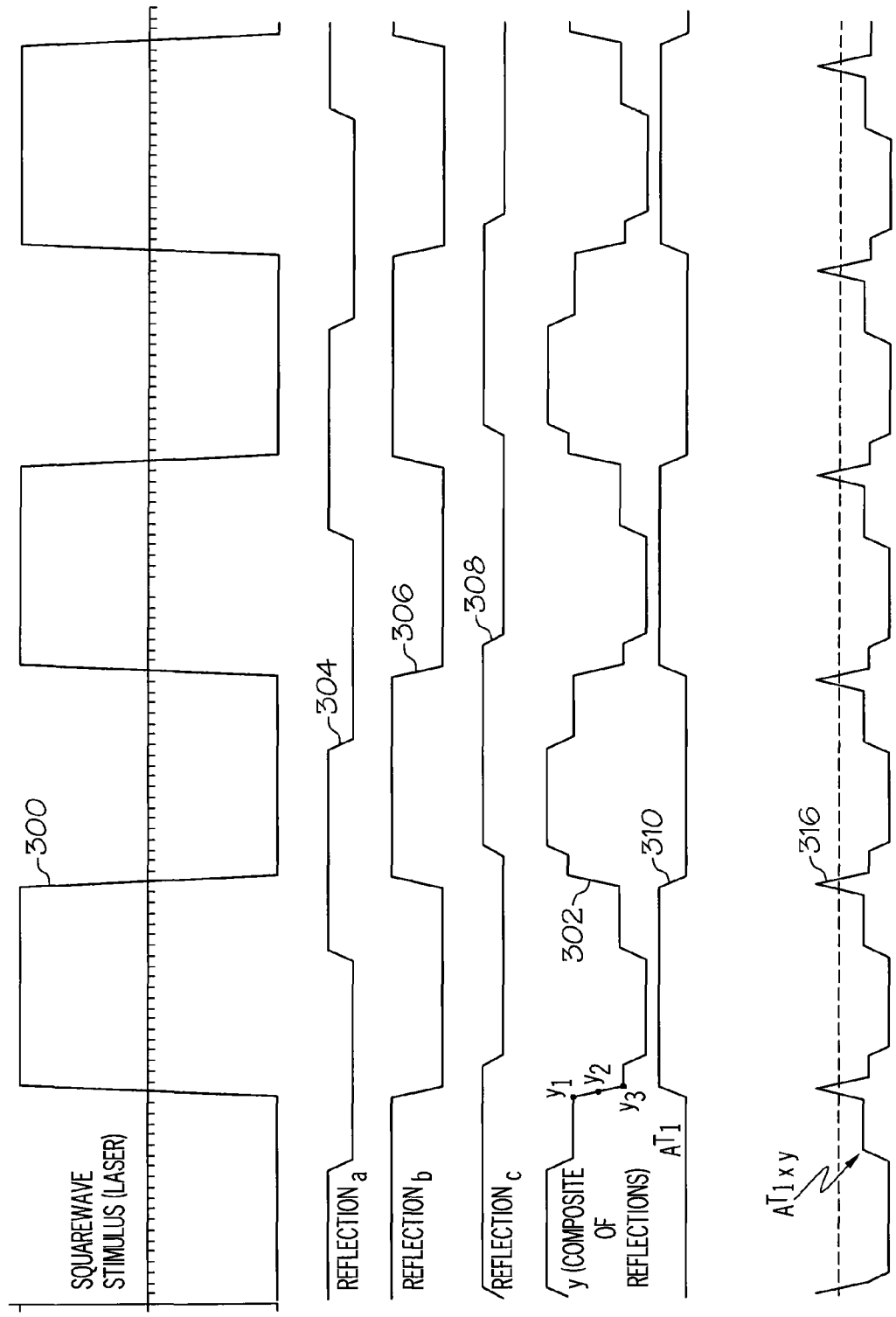

The system 100 may also include an optical signal source 110 to transmit optical signals. The optical signal source 110 may be a laser signal source or other optical source. The optical source 110 may emit an optical signal or wave 112. In accordance with an embodiment of the present invention, the optical wave 112 may be an optical square wave. An example of the optical wave 112 is illustrated in FIGS. 3A-3C as square wave stimulus 300. The optical signal or square wave 112 may be transmitted to a partial mirror 114 in response to an input signal 116 or other stimulus. The partial mirror 114 may transmit at least a portion of the optical square wave 112 into a terminal end 118 of the fiber optic transmission line 104. The square wave 112 may then propagate along the length of the line 104. When the square wave 112 encounters an anomaly in the line 104 or optical medium, optical energy or a reflected optical waveform 120 may be reflected back toward the terminal end 118 of the line 104 or medium. The reflected optical waveform 120 or signal is a function of the difference in indices of refraction between the fiber material and the other material (usually air) at any break. The reflected optical waveform 120 will be a composite waveform including reflections from all anomalies in the line 104 or medium. The reflected optical waveform 120 may be substantially reflected by the partial mirror 114 into an optical receiver 122. The reflected optical waveform 120 may be converted to an electrical waveform 124 by the optical receiver 122. An example of the electrical representation of the reflected waveform 124 is illustrated in FIGS. 3A-3B as waveform y 302. As previously discussed, the reflected waveform 302 may be a composite of waveform reflections from all anomalies in the optical medium 104 as illustrated by reflection waveforms 304-308 in FIGS. 3A-3B. It should be noted that reflection waveforms 304-308 are not separately observable as illustrated in FIGS. 3A-3C and are merely presented here to explain how reflected waveform 302 which can be observed may be a composite of multiple reflected waveforms.

A module or analog multiplier 126 may combine or multiply the reflected electrical waveform 124 and a reference waveform 128 to form a resulting waveform 130. The reference waveform 128 may be generated by a reference wave generator or square wave generator 132. The reference waveform 128 may correspond substantially to the optical square wave 112 and may be time delayed or phase delayed a predetermined duration by a variable delay module 134. The predetermined time duration or phase delay may correspond to a selected sampling distance, segment, or interval along the transmission line 104 or other optical medium.

The fiber optic transmission line 104 may be divided or segmented into a predetermined number of segments (N) or intervals for purposes of analysis and identifying a location of an anomaly. The variable time delay module 134 may perform a gating function. As described in more detail herein, a predetermined number of reference waveforms 128 may actually be generated by reference wave generator 132. The predetermined number of reference waveforms 128 may correspond to the number of segments (N) or intervals of the line 104 or optical medium. The variable delay module 134 may delay each successive reference waveform 128 by a selected time duration or phase corresponding to successive segments or interval along the line 104 or optical medium to measure optical characteristics or to detect any anomaly within each segment or interval. The reflected electrical waveform 124 when combined with one of the delayed reference waveforms 128 by multiplier 126 will produce the resulting waveform 130 including an indication of any reflections from that segment, interval or sample position along the line 104 or medium that corresponds to the selected time delay or phase.

The plurality of delayed reference waveforms 128 may be represented in a matrix form $A^T$ as described herein to determine an amplitude of the resulting waveform 130 at different segments or sample positions along the line 104 to detect any anomalies. Examples of delayed reference waveforms for the first three rows of matrix $A^T$ which correspond to the first three segments or sample positions along the line 104 or optical medium are illustrated in FIG. 3A as waveforms $A^T_1$ 310, $A^T_2$ 312, and $A^T_3$ 314. An example of a resulting waveform 130 formed by combining the composite waveform y 302 and the first delayed reference waveform $A^T_1$ 310 in multiplier 126 is illustrated in FIG. 3B as $A^T_1 \times y$ waveform 316.

The system 100 may also include a controller or microcontroller 136 to facilitate determination of the optical characteristics of the line 104 or medium or to detect reflections resulting from anomalies in the line 104. The microcontroller 136 may include an analog-to-digital converter (A/D) 138 to receive the resulting waveform 130 and to convert the signals to a corresponding digital signal or waveform, or to sample the resulting waveform 130.

The microcontroller 136 may also include a microprocessor 140. The microprocessor 140 may perform various control functions and analysis of the waveforms as described in more detail herein. The microcontroller 136 may process the resulting waveform 130 to detect or identify any anomaly and a location of the anomaly in the optical medium based on an amplitude of the resulting waveform 130 at a sample delay position in the resulting waveform. As described herein with reference to FIG. 2, the microprocessor may perform a least-squares solution of a mathematical or matrix representation of the resulting waveform 130 to identify any anomalies and their location along the line 104 or medium based on an amplitude value and a position of the value in a solution matrix.

The microprocessor 140 may be coupled to an output device or system 142. In one embodiment of the present invention, the output system 142 may perform additional analysis of the waveforms or data generated by the microprocessor 140. In another embodiment of the present invention the output device or system 142 may be a display or other output device that may present the waveforms and other data to a user for analysis or evaluation. In a further embodiment, the output device or system 142 may be a buffer or similar storage device to store the data for access by other external systems (not shown).

The microcontroller 140 may also control operation of the variable delay module 134 to selectively delay the reference waveform 128 to correspond to different segments along the line 104 or medium for measuring optical characteristics or detecting any anomalies or defects along the line 104 or medium.

Figure 2A:
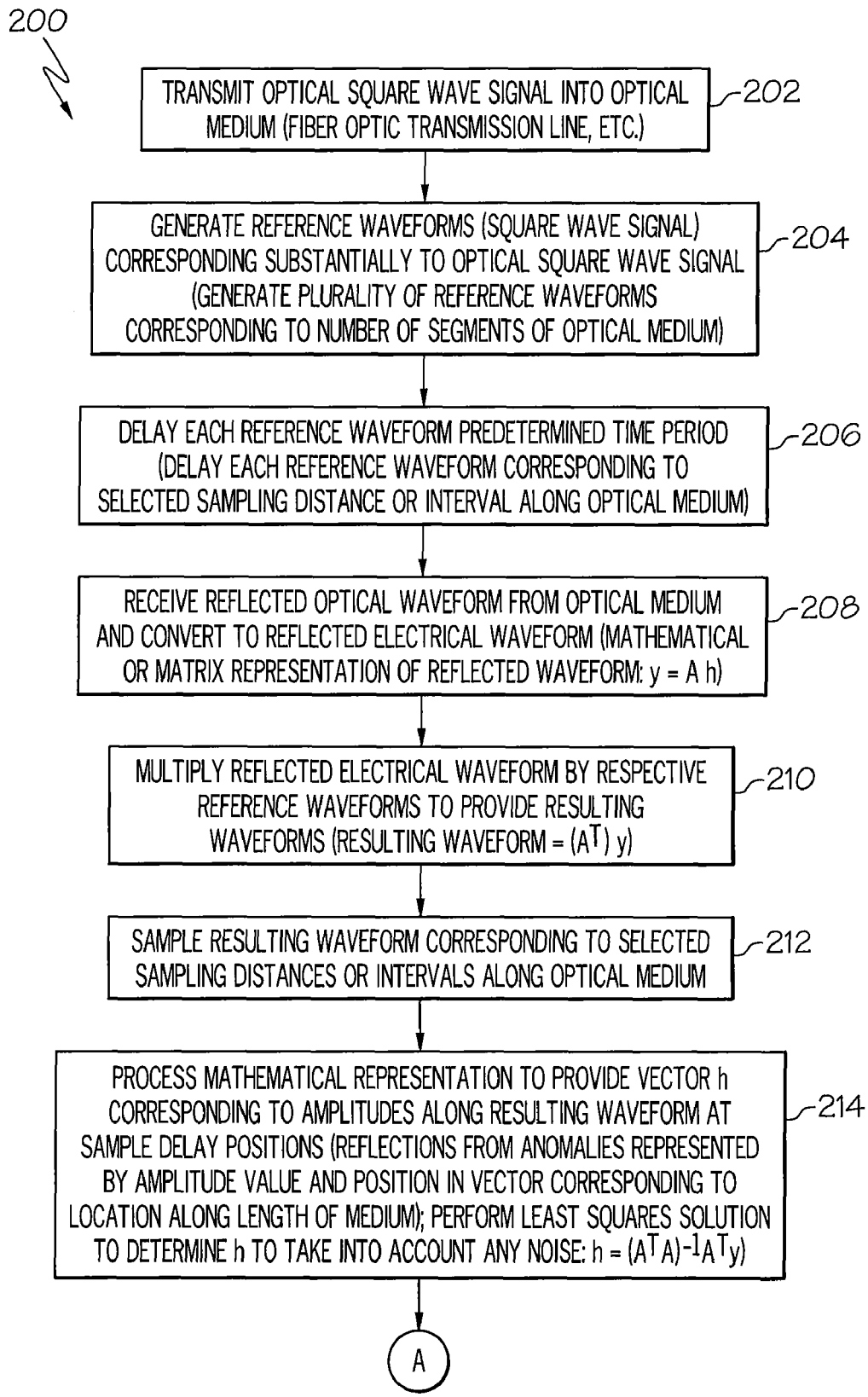
FIGS. 2A and 2B (collectively FIG. 2) are a flow chart of an exemplary method to measure optical characteristics from a selected segment of a fiber optic transmission line or other optical medium in accordance with an embodiment of the present invention.
Figure 2B:
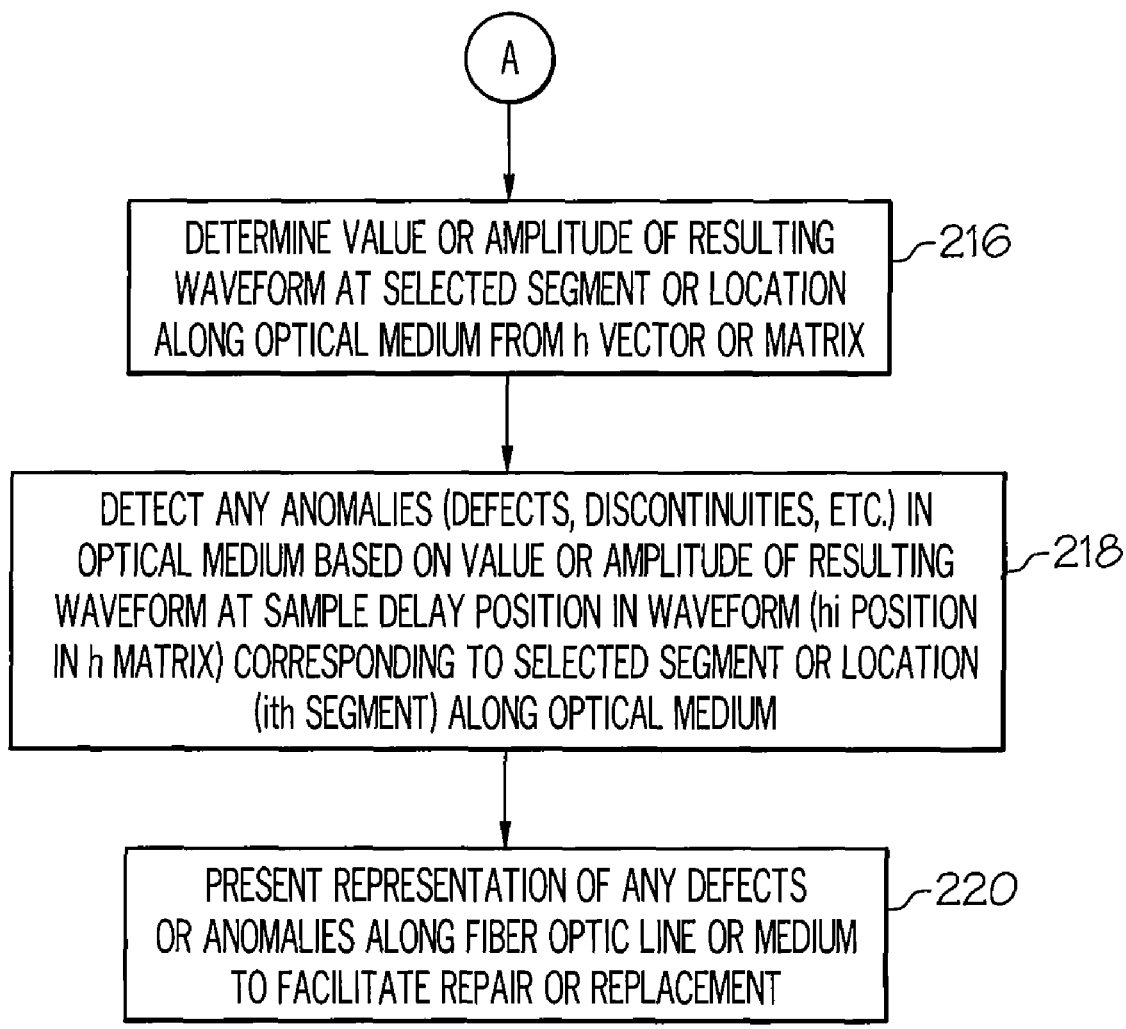

FIGS. 2A and 2B (collectively FIG. 2) are a flow chart of an exemplary method 200 to measure optical characteristics or to detect any anomalies from a selected segment of a fiber optic transmission line or other optical medium in accordance with an embodiment of the present invention. The method 200 may be embodied in the optical system 100 of FIG. 1 or a similar system and may be performed thereby. In block 202, an optical square wave signal or the like may be transmitted into the optical medium. As previously discussed, an example of an optical square wave is illustrated by waveform 300 in FIGS. 3A-3C. The optical medium may be a fiber optic transmission line or other optical medium for transmitting a laser or other optical or light energy signal or waveform.

In block 204, a plurality of reference waveforms may be generated. The reference waveforms may correspond substantially to the optical wave generated in block 202. Accordingly, reference waveforms may each be a square wave as well. In block 206, each reference waveform may be delayed a predetermined time period or phase. The delay or phase delay may correspond to a selected sampling distance or interval along the optical medium. As previously discussed, the optical medium may be divided into a selected number of segments (N) to facilitate locating any anomalies as described herein. As previously discussed, each successive reference waveform may be delayed a predetermined time duration or phase corresponding to successive segments, intervals or sampling locations along the optical medium.

In block 208, a reflected optical waveform may be received from the optical medium. The reflected optical waveform may be converted to a reflected electrical waveform. The reflected optical waveform along the optical medium may be represented mathematically or in a matrix formulation. The mathematical or matrix representation of the reflected wave along the optical medium may be expressed as equation (1):

$$y = Ah \quad (1)$$

Here, y is a column vector that may include a selected number of samples of the reflected waveform. The selected number of samples may each correspond to the selected sampling distance, sampling position, or interval along the length of the optical medium and the selected number of segments (N) in which the optical medium may be divided or segmented. Accordingly, y may be an N×1 column vector. Examples of three samples y1, y2 and y3 are illustrated in FIGS. 3A-3B.

The A matrix may be a matrix including a selected number of rows and columns. Again, the selected number may correspond to the selected number of segments (N) in which the optical medium may be divided and the selected sampling distance or interval along the resulting waveform corresponding to the length of the optical medium. Accordingly, the A matrix may be an N×N matrix.

Each row of the A matrix may correspond to a delayed representation of the optical square wave transmitted into the optical medium in block 202 and to a mathematical representation of the delayed reference waveform which may be generated by the reference generator 132 and variable delay 134 of FIG. 1. The delayed representation of the optical square wave in each successive row is incrementally delayed by a sample delay position along the optical medium. For example, the first row of the A matrix may contain a one-sample-delay replica of the original optical square wave or, in other words, a delay corresponding to a first sample position along the optical medium or resulting waveform. The second row of the A matrix may contain a two-sample-delay replica of the original optical square wave or, in other words, a delay corresponding to a second sample position along the optical medium or resulting waveform and so forth for the other rows of the A matrix.

The h represents another column vector including a plurality of elements corresponding to an amplitude along the resulting waveform at a plurality of sample delay positions or segments. Any delayed reflections caused by an anomaly may be represented by an amplitude value in a position in the h column vector corresponding substantially to a sample location along the optical medium. For example a value in $h_1$ of the column vector is the amplitude of the one-sample-delay reflection or the amplitude of a reflection from a first sample position along the optical medium or resulting waveform. A value in $h_2$ of the column vector is the amplitude of the two-sample delay reflection or the amplitude of a reflection from a second sample position along the optical medium or resulting waveform.

In block 210, the reflected electrical waveform may be combined, multiplexed or multiplied with the respective delayed reference waveforms to provide resulting waveforms. As previously discussed, an example of the resulting waveform for the reflected signal combined or multiplied by a first a delayed reference waveform is illustrated in FIG. 3B as waveform 316. The resulting mathematical or matrix representation for the resulting waveforms may be expressed as equation (2):

$$\text{Resulting Waveform} = (A^T)_i \times y \quad (2)$$

Where the subscript "i" indicates the i-th row of the $A^T$ matrix. $A^T$ is the A matrix transposed as is known in signal processing. The resulting waveform or waveforms represented by equation (2) may correspond to the resulting waveforms 130 generated by the analog multiplier 126 of FIG. 1. The delay from the variable delay module 134 chooses which row ("i") of $A^T$ is used for the algorithm or calculation.

FIG. 3C is an illustration of an exemplary resulting waveform 318 when the correlation between the composite reflected waveform, y, and a delayed reference waveform, or delay version of the transmitted square wave, for a particular row of $A^T_i$ of the $A^T$ matrix do not correlate to any of the reflections in the reflected waveform. Row 9 of the $A^T$ matrix is used in the example illustrated in FIG. 3C ($A^T_9$). As illustrated in FIG. 3C, the average value of the product of the reflected waveform and delayed reference waveform is near zero in waveform 318 as represented by the broken line 320. When the least-squares estimate is performed by the algorithm or method 200 in block 214, the method 200 may weight this amplitude value at zero or near zero. Accordingly, the analysis may determine there are no anomalies at this segment of the optical medium.

In block 212, the resulting waveform may be sampled corresponding to a selected sampling distance, segment or interval along the optical medium. The selected sampling distance or interval will correlate with the selected number of segments (N). The resulting waveform may be sampled by virtue of the reflected waveform y being combined with a particular row of the A matrix corresponding to the delayed reference waveform and the selected segment or interval along the optical medium.

In equation (1) the y column vector and A matrix are known. Accordingly, equation (1) must be solved for the h column vector. In block 214, the mathematical representation or matrix representation of the resulting waveforms may be processed to provide the h column vector corresponding to the amplitudes along the resulting waveforms at sample delay positions. As previously discussed, reflections from anomalies will be represented by amplitude values in the h column vector and the position in the h vector will correspond substantially to a location along the length of the optical medium. A least squares solution may be performed or other statistical signal processing to determine h and to take into account any noise. The resulting matrix operations may be expressed as in equation (3)

$$h = (A^T A)^{-1} A^T y \quad (3)$$

In block 216, a value or amplitude value of the resulting waveform may be determined at a selected segment or location along the optical medium from the h vector or matrix. In block 218, any anomalies, defects, discontinuities, connectors, or the like, may be detected or identified in the optical medium based on the value or amplitude of the resulting waveform at the sample delay position in the waveform from the position $h_i$ in the h column vector corresponding to the selected segment or location ($i^{th}$ segment) along the optical medium.

In block 220, a representation of any anomalies, defects or the like along the optical medium, fiber optic transmission line or the like may be presented to a user to facilitate repair or replacement.

Figure 4:
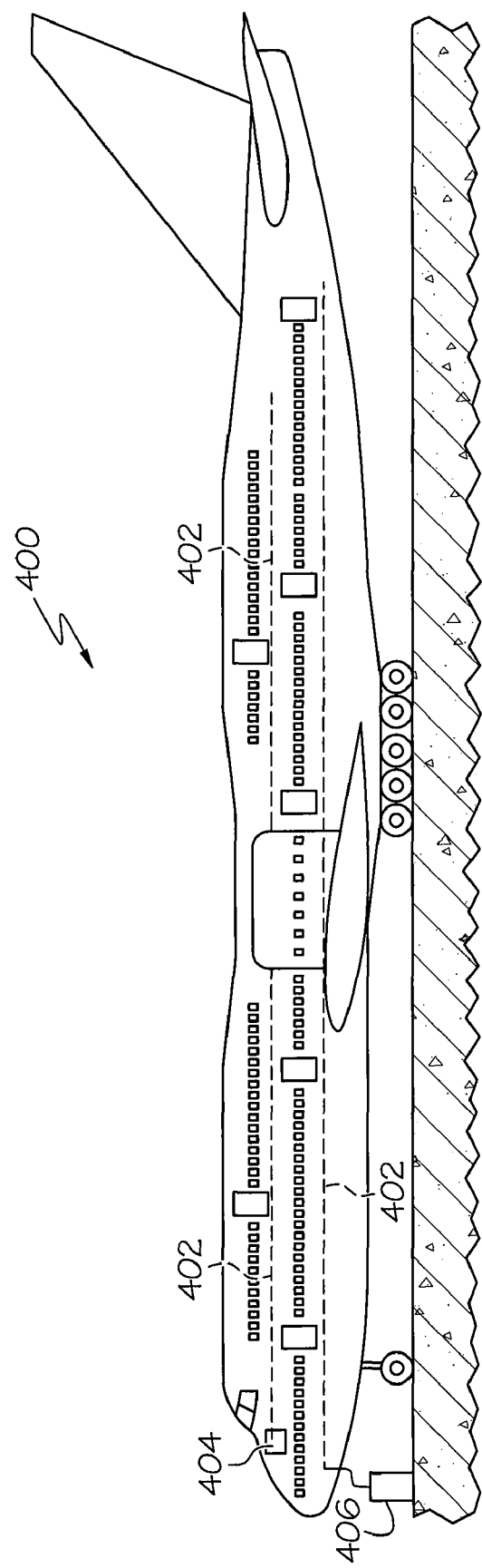
FIG. 4 is an illustration of an exemplary aerospace vehicle including an optical system and mixer-based time domain reflectometer in accordance with an embodiment of the present invention.

FIG. 4 is an illustration of an exemplary aerospace vehicle 400 including an optical system 402 and optical phase time domain reflectometer device 404 in accordance with an embodiment of the present invention. The aerospace vehicle 400 may be a commercial passenger aircraft as provide by the Boeing Company of Chicago, Ill. or other type of aircraft. The optical systems 402 may be similar to the optical system 100 of FIG. 1. Various embodiments of an optical system, similar to optical system 100 of FIG. 1 may be used in association with various system and sub-systems of the aircraft 400, such as flight control systems, communications systems within the aircraft 400, such as telecommunications systems, in flight entertainment systems, Internet access systems and the like distributed to passenger seating, as well as other aircraft systems. The various embodiments of the optical system 402 and reflectometer device 404 may be used to perform fault-checking and/or operational monitoring of the fiber optic transmission lines or other optical medium that may be included in these various systems.

Although FIG. 4 illustrates the reflectometer device 404 as possibly being an integral component of the aircraft 400, those skilled in the art will readily understand that one or more embodiments of the reflectometer device 404 may also be incorporated into a portable test device, such as device 406 that may be separately coupled to the various systems and sub-systems of the aircraft 400 to perform any ground-based or other diagnostic analysis on selected optical systems.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An apparatus to measure optical characteristics of an optical medium, comprising:
an optical source to generate an optical square wave for transmission into the optical medium;
an optical receiver to receive a reflected optical waveform from the optical medium caused by a portion of the optical square wave being reflected by any anomaly in the optical medium and wherein the optical receiver converts the reflected optical waveform to a reflected electrical waveform;
a module to combine the reflected electrical waveform with a reference waveform to form a resulting waveform, wherein the reference waveform corresponds substantially to the optical square wave and is delayed a predetermined time duration;
a controller that processes the resulting waveform to detect any anomaly and a location of the anomaly in the optical medium based on an amplitude of the resulting waveform at a sample delay position in the resulting waveform, wherein the controller comprises a microprocessor that generates a mathematical representation of the resulting waveform from sampling the resulting waveform, and wherein the mathematical representation comprises the resulting waveform represented in a matrix form comprising:
a column vector including a selected number of samples of the resulting waveform corresponding to a length of the optical medium;
a matrix including a selected number of rows and columns, wherein each row corresponds to a delayed representation of the optical square wave and wherein the delayed representation of the optical square wave in each successive row is incrementally delayed by a sample delay position along the optical medium; and
another column vector including a plurality of elements corresponding to an amplitude along the resulting waveform at a plurality of sample delay positions, wherein any delayed reflections caused by an anomaly are represented by an amplitude value in a position in the column vector corresponding substantially to a sample location along the optical medium, and wherein the column vector including the selected number of samples of the resulting waveform is equated to the matrix multiplied by the other column vector.

2. The apparatus of claim 1, wherein the module comprises an analog multiplier to multiply the reflected electrical waveform with the reference waveform to form the resulting waveform.

3. The apparatus of claim 1, wherein the controller is adapted to represent the resulting waveform as a mathematical function.

4. The apparatus of claim 1, wherein the controller is adapted to perform matrix operations to produce the amplitude of the resulting waveform at a plurality of sample delay positions each corresponding to a sampling position along the optical medium.

5. The apparatus of claim 1, wherein the controller is adapted to perform a least squares solution to determine the amplitude of the resulting waveform at a plurality of sample delay positions.

6. The apparatus of claim 1, wherein the controller comprises:
an analog to digital converter to sample the resulting waveform.

7. The apparatus of claim 1, wherein the microprocessor is adapted to perform a least squares solution to determine the elements in the other column vector.

8. A method to measure optical characteristics of a fiber optic transmission line or other optical medium, the method comprising:
transmitting an optical wave into the fiber optic transmission line or other optical medium;
receiving a reflected optical waveform from the optical medium caused by a portion of the optical square wave being reflected by any anomaly in the optical medium;
converting the reflected optical waveform to a reflected electrical waveform;
combining the reflected electrical waveform with a reference waveform to form a resulting waveform, wherein the reference waveform corresponds substantially to the optical square wave and is delayed a predetermined time duration;
representing the resulting waveform in a matrix formulation, wherein representing the resulting waveform in a matrix formulation comprises:
forming a column vector including a selected number of samples of the resulting waveform corresponding to a length of the optical medium;
forming a matrix including a selected number of rows and columns, wherein each row corresponds to a delayed representation of the optical square wave and wherein the delayed representation of the optical square wave in each successive row is incrementally delayed by a sample delay position along the optical medium; and
forming another column vector including a plurality of elements corresponding to an amplitude along the resulting waveform at a plurality of sample delay positions, wherein any delayed reflections caused by an anomaly are represented by an amplitude value in a position in the column vector corresponding substantially to a sample location along the optical medium, and wherein the column vector including the selected number of samples of the resulting waveform is equated to the matrix multiplied by the other column vector; and
processing the matrix formulation of the resulting waveform to detect any anomaly and a location of the anomaly in the optical medium based on an amplitude of the resulting waveform at a sample delay position in the resulting waveform.

9. The method of claim 8, wherein combining the reflected electrical waveform with the reference comprises multiply the reflected electrical waveform with the reference waveform to form the resulting waveform.

10. The method of claim 8, further comprising performing matrix operations to produce the amplitude of the resulting waveform at a plurality of sample delay positions each corresponding to a sampling position along the optical medium.

11. The method of claim 8, further comprising performing a least squares solution to determine the amplitude of the resulting waveform at a plurality of sample delay positions.

12. The method of claim 8, further comprising performing statistical signal processing to identify any anomalies.

* * * * *